United States Patent [19]
Milone

[11] Patent Number: 5,200,989
[45] Date of Patent: Apr. 6, 1993

[54] WIDE BAND COMMUNICATION SYSTEM TRANSMITTING VIDEO AND AUDIO SIGNALS AMONG A PLURALITY OF USERS

[75] Inventor: Francesco Milone, Gaggiano, Italy

[73] Assignee: Italtel Societa Italiana, Milan, Italy

[21] Appl. No.: 659,314

[22] PCT Filed: May 23, 1989

[86] PCT No.: PCT/EP89/00569
§ 371 Date: Feb. 15, 1991
§ 102(e) Date: Feb. 15, 1991

[87] PCT Pub. No.: WO89/12944
PCT Pub. Date: Dec. 28, 1989

[30] Foreign Application Priority Data
Jun. 16, 1988 [IT] Italy ................................. 20982 A/88

[51] Int. Cl.⁵ ........................................... H04M 11/00
[52] U.S. Cl. ........................................ 379/53; 379/96
[58] Field of Search ............... 379/53, 54, 93, 96–98, 379/90, 110; 358/85

[56] References Cited
U.S. PATENT DOCUMENTS
3,922,491 11/1975 Björk ..................................... 379/54
4,533,943 8/1985 Poirier ................................... 379/54

FOREIGN PATENT DOCUMENTS
3210674 10/1983 Fed. Rep. of Germany ........ 379/53

OTHER PUBLICATIONS
J. S. Mayo, "Universal Information Services", Proceedings of the National Communications Forum, vol. 39, 1985, pp. 540–549.
J. W. Coenders, "Switching telephone and video-telephone signals", Philips Tech. Rev. (Netherlands), vol. 36, No. 10, 1976, pp. 291–301.
H. Ikeda et al., "Study on video switching system", Review of the Electrical Comm. Lab, vol. 25, No. 1–2, pp. 1–8, Jan.–Feb. 1977.

Primary Examiner—James L. Dwyer
Assistant Examiner—Wing F. Chan

[57] ABSTRACT

It is described a wide band communication system suitable to allow the exchange of audio signals, video signals and data among a plurality of users ($U_1, U_2, \ldots, U_j$), either the same are abutted to a same switching node (NC) or to switching nodes distant among them from the geographical point of view.

Solutions suitable to allow a particularly simple and economic realization of the means for the control of the signalling relevant to the video link, suitable to allow a particularly simple and cheap realization of the switching matrix, as well as to align audio signals to video signals are foreseen (FIG. 2).

7 Claims, 5 Drawing Sheets fig.1 fig.4 fig.2 fig.3 fig.5 fig. 6

WIDE BAND COMMUNICATION SYSTEM TRANSMITTING VIDEO AND AUDIO SIGNALS AMONG A PLURALITY OF USERS

FIELD OF THE INVENTION

This invention relates to a wide band communication system, and in particular to a system suitable to switch audio signals, video signals and data.

BACKGROUND OF THE INVENTION

In the field of added value telephone services, there is an increasing demand for transmission of video signals and data in addition to the transmission of audio signals. In particular, the need to exchange the above mentioned signals both in local environments (e.g. users of a same company) and remote environment (e.g. users of two different companies placed in distant geographical areas even hundreds of kilometers apart) is now well recognized.

In order to meet the above mentioned requirements, users must be supplied with a working station to facilitate teleconferencing or the like including equipment such as:
  one telephone set;
  one terminal equipped with display;
  one telecamera.

These work stations are connected to a switching node which must also be connected to one or more remote switching nodes by means of transmission lines suitable for the transmission of video signals, possibly in a compressed form. Of course the connection between two users abutted to two different switching nodes involves the presence, in each node, of means suitable to detect signalling criteria and also to send them towards the remote switching node.

In a known solution, the unit controlling a switching node is configured in such a way to detect signalling criteria relating to the video link and to send the signalling criteria, through a signalling channel abutted the video link, to the control unit of the remote switching node. This solution allows the connection between two geographically distant users, but is expensive since the control unit of each switching node is of a complexity which can be compared to that of control units of a digit switching exchange.

In the field of wide band communication systems, the problem of diffused services must be considered, that is the problem of sending on whichever matrix output is available, a predetermined number of channels which can in this way be distributed to users requiring the same. Audio, visual and data sources can be allocated to diffusion channels which can be distributed to selected users connected to the switching matrix which are interested in receiving signals emitted by such sources. This is the case for instance of a lesson recorded on videocassette and transmitted on a selected diffusion channel to be received through the switching matrix by all concerned users.

Solutions are known foreseeing the use of a "monostage" matrix, that is a matrix having a number of crossing points equal tot he number of inputs for each of the number of outputs. These solutions allow the immediate realization of diffusion services but are costly, especially when the number of inputs/outputs is high (e.g. 200 inputs and 200 outputs). Currently, the cost of a crossing point of the subject type is approximately 40 dollars and therefore the cost of the mentioned matrix totals to 1.6 million dollars.

Solutions exist which reduce the number of crossing points but foresee the realization of multistage matrixes having a higher blocking probability which increase with increasing reduction of crossing points compared to the above mentioned number.

Solutions also exist which allow a reduction in the number of crossing points without increasing the matrix blocking probability (they are known in the specific technique referred to as "closs"), but these solutions do not allow the realization of diffusion services.

A generic working station, as specified above, can be connected to a working station abutted to a remote switching node by means of coding equipment suitable to compress the band of the video signal.

Such coding equipment is configured to emit, at the output, bit strings obtained by processing the video signal received at the input. This processing operations require a determined time, which is sometimes of variable magnitude with he result that the remote user receives the audio signal and, with a variable delay, the video signal. The resultant effect is disturbing, for example, when the face of the remote user is framed, since the voice is received in advance of the image reproducing movements of the mouth. To overcome this problem, solutions have been identified which insert delay circuits into the audio lines to introduce a delay equal to the one introduced by coding equipment on video signals.

Since the coding equipment introduce a variable delay related to the speed of change of images shot by the telecamera, the delay circuits of the audio signal are expensive and complicated to realize.

OBJECTS OF THE INVENTION

It is an object of this invention to identify circuit solutions suitable to enable a particularly simple and inexpensive realization of the circuitry controlling the signalling related to the video link.

It is another object of the present invention to identify solutions suitable to enable a particularly simple and inexpensive realization of a switching matrix suitable to enable the distribution in a non blocking manner, of diffusion channels.

A further object of the present invention is to identify solutions suitable to synchronize the audio signal to the video signal, when a videolink between two users abutted to two different switching nodes is established.

SUMMARY OF THE INVENTION

The subject of this invention is therefore a wide band communication system including at least a switching node to which it is abutted at least one user equipped with a working station suitable to receive/emit audio signals, video signals and data.

Each switching node is configured in such a way to include:
  coupling means connected to at least one line suitable to transmit/receive video signals towards the remaining switching nodes, as well as one working station, at least through a video-phonic connection line;
  control means, receiving signalling messages generated at at least on work station, to generate signalling messages relevant to the state of said at least one video line, and to drive said coupling means;

means for switching of telephonic signals to which the telephone sets of each working station are connected through telephonic lines;

means for data transmission/reception, associated to each working station, suitable to send, or receive, to or from, the working station of the calling user through said means for phonic signal switching signalling messages received from, or to send to, the control means of the relevant switching node.

According to the invention, in the cases where a plurality of users send videocommunications and reception occurs on diffusion channels, the above mentioned coupling means consist of a multistage matrix whose last stage includes a given number of crossing points necessary to establish the connections foreseen in the field of videocommunications and p=n·m crossing points for the distribution, in a non blocking manner, to m users of n diffusion channels.

The invention also contemplates the presence of switching means positioned in each working station, suitable to disconnect the telephone set from the relevant telephonic line and to connect it to the relevant video-phonic line replying to a videocommunication request generated by the user. In this way, also the telephonic signal arrives at the input of coding means and consequently it has the same delay of video signals.

Using the circuit solutions forming the subject of the invention, it is possible to realize said video links without employing a switching node control unit of difficult realization. It is also possible to implement the above mentioned diffusion services without increasing the blocking probability of the matrix and while employing a number of crossing points only a little bit higher than necessary when these services are absent. It is also possible to align the audio signal to the video one.

BRIEF DESCRIPTION OF THE DRAWINGS

Further characteristics of the invention are detailed in the following description, relevant to a non-limitative example of realization and supplied with the following figures where.

DETAILED DESCRIPTION OF PREFERRED EMBODIMENTS

Figure 1:
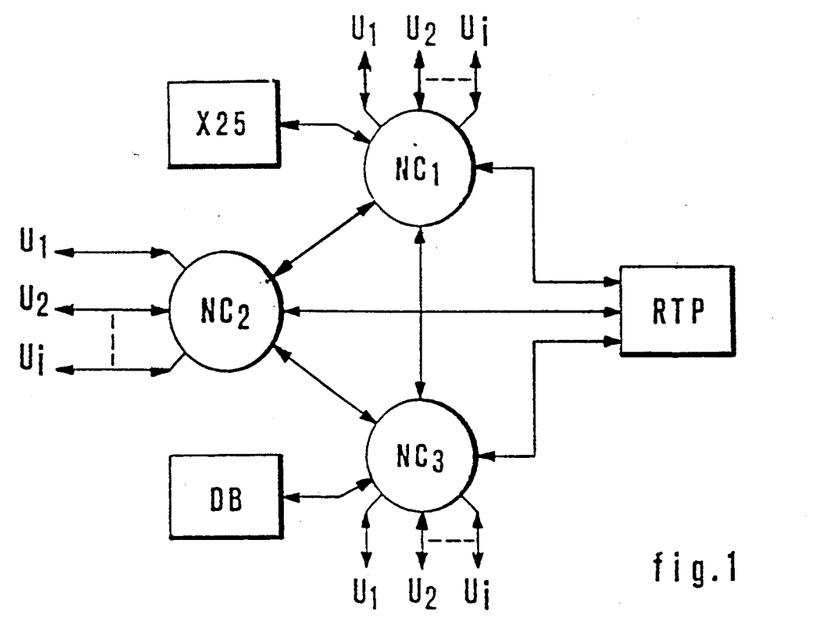
FIG. 1 shows the block diagram of the communication system carried out according to the invention.

FIG. 1 shows the block diagram of a wide band communication system which is configured in such a way to include:

a plurality of switching nodes $NC_1$, $NC_2$, $NC_3$, ... each one of them connected to a predetermined number of users $U_1$, $U_2$, $U_i$, equipped with a working station suitable to transmit/receive audio signals, video signals and data through video-phonic communication lines lvf;

the public telephone network RTP, to which the switching nodes NC are connected through telephone lines lf (or trunks);

one or more data bases DB to which users can connect themselves for consulting reasons (the figure shows the data base DB associated only to node $NC_3$);

one or more interface units X25 for interfacing with package switching networks (the figure shows the interface X25 associated only to node $NC_1$).

Considering that each user U can establish an audio and/or video link with whichever user U abutted to the same node NC or to other switching nodes NC, these nodes must be equipped with means suitable to control the signalling messages required for the construction and control of the video link.

The invention foresees to employ circuit solutions allowing considerable simplification of the control means of each switching node compared with the above mentioned solution of already known type. The preferred embodiment utilizes circuitry which allows the exchange of signalling messages (relevant to the video link between the calling user and the called user) through telephone lines lf and the public telephone network RTP, thus avoiding the sue of "dedicated" signalling channels.

The RTP network, besides realizing the telephone link between the users, also allows the exchange of signalling messages concerning a video link, which is destined to be realized through the video lines lv.

Figure 2:
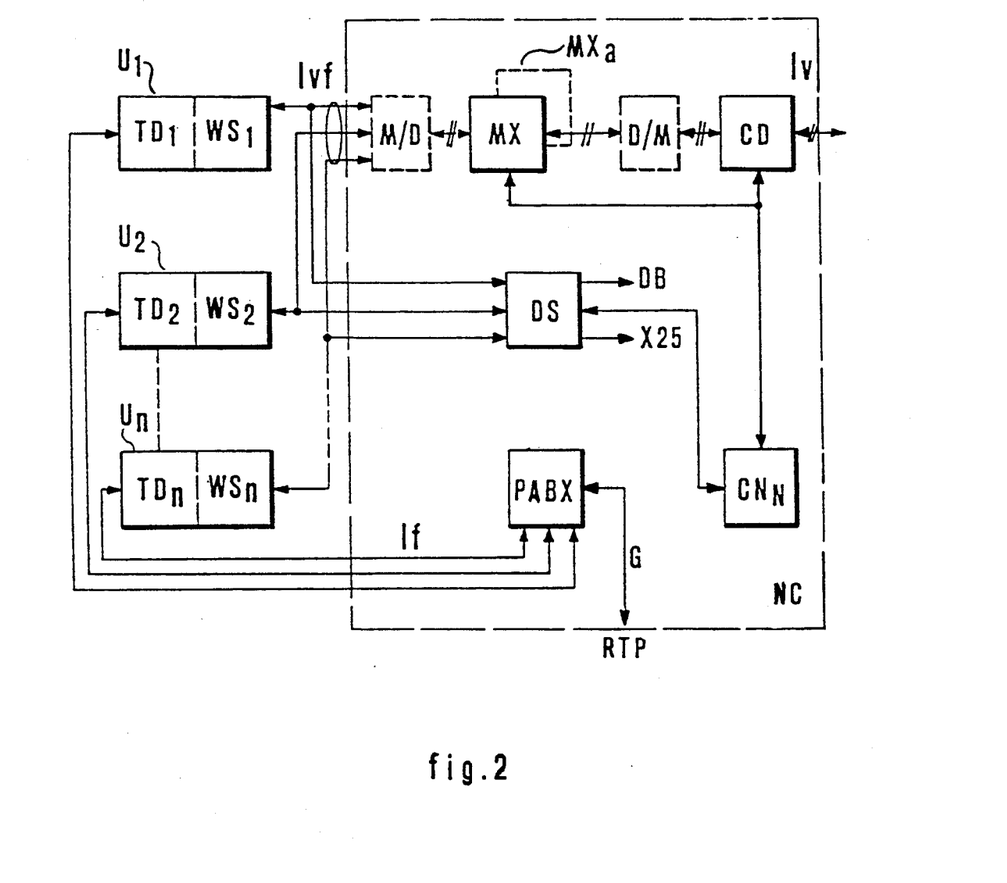
FIG. 2 shows the block diagram of a generic switching node NC of FIG. 1.

FIG. 2 shows in detail a generic switching node NC which is configured to include:

a space matrix MX to which said users U and video lines lv, are abutted through coding parts CD suitable to reduce the bandwidth of the video signal;

one switch PABX of audio signals to which the telephone sets equipping each working station of users U as well as a plurality of trunk lines G to the public telephone network RTP are connected;

one data switch DS to which said data terminals of the working station of users U and the control unit $CN_N$ of the switching node are connected. The data base DB and said interface unit X2 for interfacing with package switching networks are connected to said data switch DS.

In the cases where one interface unit X25 is not connected to the node NC and/or data switching is not foreseen, unit DS can consist of a signalling concentrator/expander, that is of one unit suitable to concentrate signalling coming from users U towards the control unit $CN_N$ and suitable also to expand signalling outgoing from unit $CN_N$ towards users U.

It must also be kept in mind that unit Ds is unnecessary when a PABX unit is employed suitable to switch both telephonic signals and data. The PABX unit is of course unnecessary when phonic lines lf are directly connected to the public network RTP.

In some cases only one user U is connected to the switching node NC. This is the case, for instance, for a company supplied with an autoswitch of PABX phonic signals to which a plurality of users are connected, the users being generally enabled to make only telephonic links with only one user being enabled to make both telephonic and video links. In this case, matrix MX consists of a simple coupling circuit and unit DS is unnecessary.

In order to considerably simplify the realization of the control unit of the switching node $CN_N$, the signalling relevant to the video connection may be sent to the remote switching node through the telephonic link established between the calling user and the called one.

In this way it is possible to avoid use of the unit $CN_N$ with a signalling channel connected to unit $CN_N$ of the remaining switching nodes NC, drastically reducing the costs of said unit. However, the sending of data (messages containing the signalling) on the above mentioned telephonic link involves the overcoming of technical problems associated with the need to not disturb telephonic conversations. To this purpose FIG. 3 shows a preferred embodiment of the invention where only the pieces of the working station necessary to solve the problem are adopted.

Figure 3:
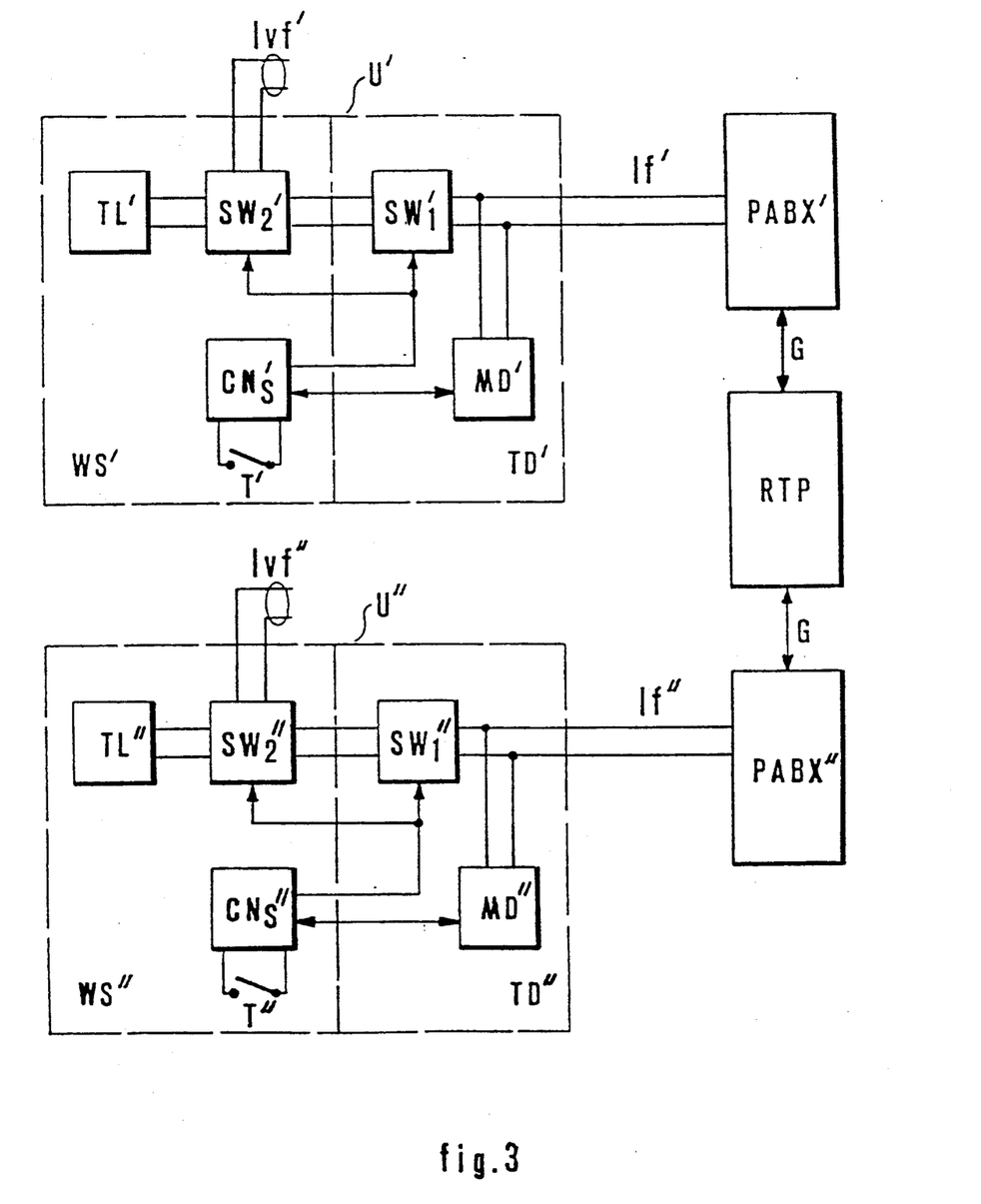
FIG. 3 shows in detail data transmission means TD of FIG. 2 realized according to the invention.

FIG. 3 shows in fact a telephone line lf' abutted to a PABX autoswitch of telephonic signals connected through trunk lines G (and possibly through the public telephone network) to a similar autoswitch PABX" to which a telephone line lf" is abutted. A telephone set TL' is connected through a switching device $SW'_1$, to the telephone line lf' abutted to the PABX, unit or a telephone set TL" through a switching device $SW'''_1$ is connected to the telephone line lf" abutted to the PABX unit. The switching device $SW'_1$, or $SW'''_1$, is operated by control devices $CN_s'$, or $CN''_s$, of the working station. A modem MD' or MD" is also connected to the telephone line lf', or lf", which modem is always connected according to the teachings of the present invention in parallel to the telephone set TL, in order not to disturb telephonic calls.

In this FIGURE it is assumed therefore that the use equipped with the telephone set TL' has requested the construction of a telephonic link with the user equipped with telephone set TL". This link has been carried out according to traditional methods through PABX' unit, PABX" unit and possibly the public telephone network RTP.

When one of the two users declares his invention to activate a videocommunication, pressing for example a key T' associated to the relevant $CN_s'$, this event is detected by the unit $CN_s'$ which initiates a number of procedures including requiring the control unit of the relevant switching node $CN_N$ to acquire one video free line lv among those connecting the same to the ode NC to which the called user is connected. This request reaches the unit $CN_N$ through the data switch DS and, always through this unit, the unit $CN_N$ sends a message containing all information (e.g. the number of the free line lv, etc.) necessary to establish a link through video lines lv to unit $CN_s$. The unit $CN_s$ also controls the sending by the modem MD' of a first frequency $f_1$ which through PABX', RTP and PABX" units reaches modem MD". This last unit also communicates the reception of frequency $f_1$ to the relevant control unit $CN_s''$ which controls the switching of the relevant switch $SW'''_1$ as well as the sending by the modem MD" of a frequency $f_2$.

Through units PABX", RTP and PABX', frequency $f_2$ reaches the modem MD' which communicates this event to unit $CN_s'$ which determines the switching of unit $SW'_1$ and sends on line lf the signalling message(s) received from the control unit of the relevant switching node $CN_N'$.

Considering that frequencies $f_1$ and $f_2$ from two carriers which can be modulated by units MD' and MD", the control units of working stations and $CN_s'$ and $CN_s''$ can carry out an exchange of signalling messages in the full-duplex form, thus allowing the construction of a video link even if units $CN_N'$ and $CN_N''$ do not have a signalling channel.

In order to obviate the above mentioned problems in reference with the delay introduced by the coding means CD of the video signal, the preferred embodiment may transmit telephonic signals both via the telephonic lines lf and video lines lv.

According to one preferred embodiment, telephonic signals are sent through the telephonic lines lf until the two users intend exchange only telephonic signals. When one of the two users declares his intention to make also a video link (operating for instance said key T of FIG. 3), the telephone set TL is connected to videophonic lines lvf instead of phonic lines lf by means of a switch $SW_2$. In this way the phonic signal follows the same path of the video signal and has the same delays overcoming the above mentioned problem.

The invention foresees two possible solutions for sending the audio signal to coding means CD. One preferred embodiment modulations the audio signal on a frequency band higher than those occupied by the video signal using a modulating/demodulating circuit M/D (see FIG. 2). The signal so obtained is sent to the input of the wide band matrix MX at whose output a demodulating/modulating circuit D/M is connected. In this way the video signal and the audio signal are sent to the input of the coding circuits CD on two separate inputs and are processed by unit CD which emits the same at the output on video lines lv aligned among them.

A second preferred embodiment utilizes an audio matrix $MX_a$, to which input audio signals are sent, while video signals are sent to the input of the above mentioned matrix MX. The presence of M/D and D/M circuits is unnecessary in this case.

Figure 4:
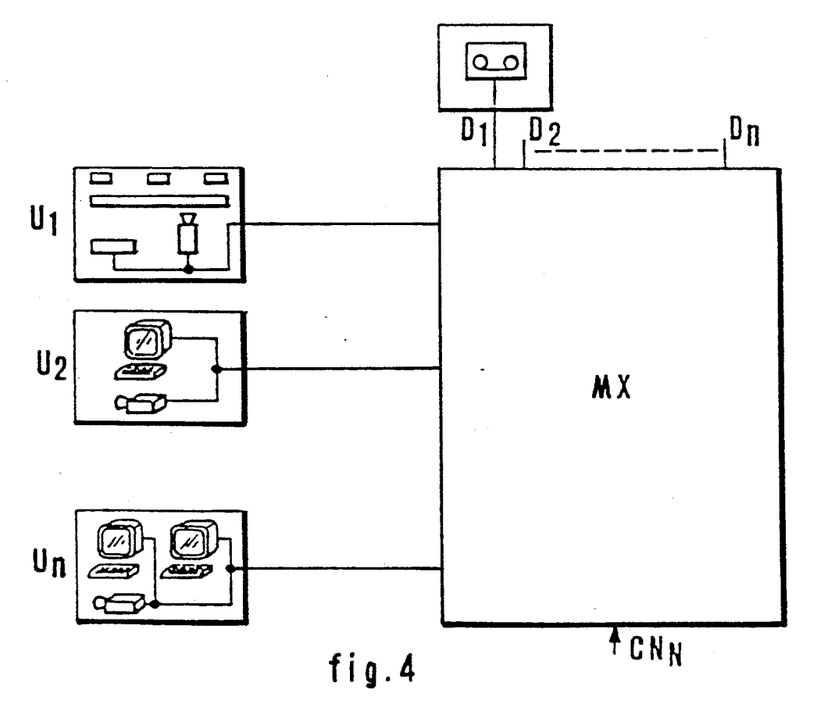
FIG. 4 shows the connection of diffusion channels to the elementary matrix MX of FIG. 2.

FIG. 4 shows the switching matrix MX to which users $U_1 1, \ldots, U_n$ are connected.

For example, user $U_1$ consists of a videoconference room, user $U_2$ of an user equipped with videoterminal and telecamera while user $U_N$ consists of a user equipped with telecamera, videoterminal and data terminal.

Each user $U_i$ can establish a link with whichever n-1 users by means of the switching matrix MX which is driven by unit $CN_N$.

A number of diffusion channels $D_1, \ldots, D_N$ are connected to matrix MX, and FIG. 4 shows the connection to channel $D_1$, of videorecording equipment suitable to send to the matrix input audio and video signals concerning, for example, a language lesson.

Figure 5:
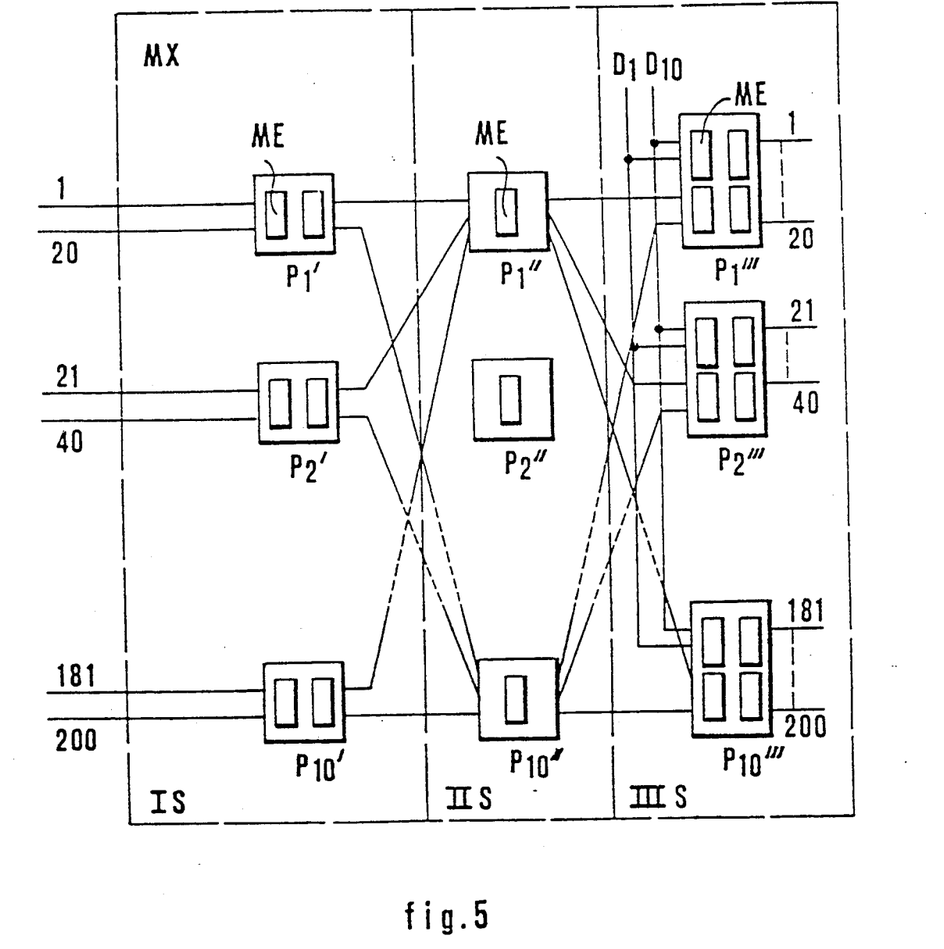
FIG. 5 shows the block diagram of matrix MX of FIG. 4, realized according to the invention.

FIG. 5 shows the block diagram of matrix MX which, according to a preferential form of realization, is of the three-stage type and is suitable to switch 200 inputs on 200 outputs (n=200). In particular this matrix foresees the use of elementary switching matrixes ME suitable to switch 10 inputs on 10 outputs and is configured in such a way to include 10 switching levels P.

The first stage IS foresees the use of switching levels $P_1', P_2', \ldots, P_{10}'$ each one including two elementary matrixes ME connected in such a way to perform a concentration function by switching 20 inputs on 10 outputs.

The second stage IIS foresees the presence of a single elementary matrix ME in each switching level $P_1'', P_2'', \ldots, P_{10}''$, in such a way to switch 10 inputs on 10 outputs, where each unit ME receives at the input the i-th output of the first stage IS.

The third stage IIIS includes 10 switching levels $P_1''', P_2''', \ldots, P_{10}'''$ and each level consists of a first pair of elementary matrixes ME connected in such a way to perform an expansion function, switching 10 inputs to 20 outputs; and a second pair of elementary matrixes ME, connected in such a way to perform an expansion function switching 10 diffusion channels on said 20 outputs.

A matrix MX dimensioned as explained above exhibits a predetermined blocking probability as far as videocommunications are concerned while no blocking occurs in the distribution of diffusion channels. On the basis of the above mentioned example of realization of matrix MX, this matrix is configured to include 5 thousands crossing points (2 thousands in the first stage, 1000 in the second stage, 2 thousands in the third stage) to switch 200 inputs on 200 outputs, and further 2 thousands crossing points to diffuse 10 diffusion channels $D_1, \ldots, D10$ to the 200 users connected to the switching matrix.

Making reference to the application example considered above, the space matrix for diffusion services realized according to the invention employs therefore 7 thousands crossing points to switch 200 inputs on 200 outputs and diffuse 10 diffusion channels.

In the known systems foreseeing the employing monostage matrixes having the same capacity (200 inputs on 200 outputs) the number of crossing points totals to 40 thousands, which gives proof of cost reduction which can be obtained using the solutions according to the invention.

Of course depending on the change in the number of inputs/outputs, the desired blocking probability of videocommunications and the number of diffusion channels, the number of crossing points deviate from the example mentioned above but is always considerably lower than the one obtained in presence of monostage matrixes.

The calculation of the number of the crossing points necessary for the distribution of said diffusion services in a non blocking manner, can be made using the relation:

$$p = n \cdot m,$$

where p is the number of necessary crossing points, n is the number of diffusion channels and m is the number of users abutted to the matrix.

Figure 6:
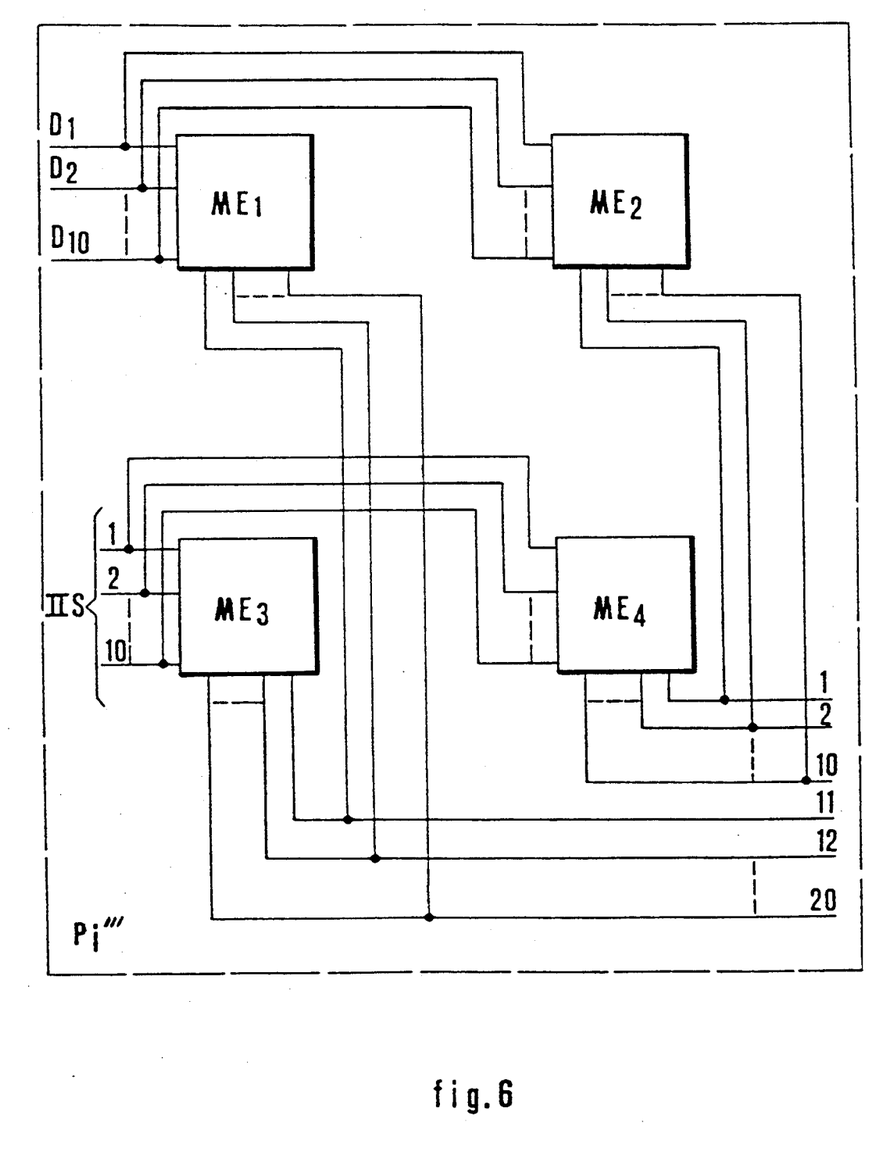
FIG. 6 shows a generic switching plan of the third stage of matrix MX of FIG. 5.

FIG. 6 shows in detail the connections among elementary matrixes ME of a generic switching plan of the third stage IIS.

In particular matrixes $ME_1$ and $ME_2$ have the function of distributing the diffusion channels $D_1, \ldots, D_{10}$ to the 20 users abutted at the output of the subject switching plan without blocking.

Matrixes $ME_3$ and $ME_4$ receive at the input the 10 outputs of the second switching stage IIS and make an expansion function distributing these 10 outputs to the above mentioned 20 users.

Of course if at any moment a diffusion channel D reaches one of said 20 outputs, no videocommunication can be sent to that output.

In the light of the above it is clear that the communication system realized according to the invention fully meets the requirements described in the object, since it allows a particularly simple and inexpensive realization of the control unit $CN_N$ of the switching node, of the switching matrix MX and of the means for the alignment of audio and video signals.

I claim:

1. In a wide band communication system in which a plurality of users employing work stations are each connected to a switching node via communication lines, the work stations receiving and/or transmitting audio signals, video signals and data, the switching node comprising:
   control means, responsive to signals produced by said work stations on said communication lines, for generating signaling messages identifying the presence of a video signal on a said communication line;
   coupling means, responsive to said signalling messages generated by said control means, for selectively coupling a communication line to a selected one of a plurality of internodal lines connected to a selected additional switching node, said coupling means selecting a video path within said node between a said communication line and a said internodal line when the presence of a video signal is identified by said control means; and
   coding means, disposed in said video path, for selectively concentrating or expanding said video signal.

2. The system of claim 1 wherein said switching node further comprises;
   means for switching telephone signals from a selected work station to a desired destination through telephonic lines;
   data transmission and reception means, responsive to the signaling messages produced by said control means, for transmitting data from the communication line connected to a transmitting workstation to a desired destination.

3. The system of claim 1 wherein said data transmission and reception means is partially located in each said work station and includes:
   a work station control unit, located in said work station and selecting a communication line on which said data is to be transmitted;
   first switching means, located in a said work station and responsive to said workstation control unit, for enabling said communication line selected by said control unit to transmit or receive data;
   a modem interposed between said data source and said first switching means to modulate and demodulate input signals for providing said control means with the signals produced by the work stations.

4. The system of claim 1 wherein said switching node further comprises a data switch connected to an interface unit external to said switching node for interfacing the remainder of the switching node to a data transmission network.

5. The system of claim 1 wherein said communication lines include an audio line and a video line connected between each said work station and an associated switching node,
   each said work station further including second switching means for selectively switching between the audio and video lines connected thereto in response to a videocommunication request;
   said system further comprising modulation/demodulation means, connected to the output of said coupling means, for selectively frequency shifting video or audio signals for transmission on a selected internodal line.

6. The system of claim 1 wherein said communication lines include an audio line and a video line connected between each said work station and an associated switching node, and said internodal lines include audio internodal lines and wideband internodal lines, each said work station further including second switching means for selectively switching between the audio and video lines connected thereto in response to a videocommunication request;

said coupling means including first matrix means for selectively connecting a video line to a said wideband internodal line and second matrix means for selectively connecting an audio line to a said audio internodal line.

7. The system of claim 1 wherein said switching node is connected to m users for both videocommunication and diffusion channel purposes;

said coupling means being a multistage matrix having a last stage including a predetermined number of crossing points p necessary to establish a predetermined number of links, the number of diffusion channels being determined by $p = n \cdot m$.

* * * * *